No. 786,026. PATENTED MAR. 28, 1905.
C. B. HALDEMAN.
SNOW OR ICE VEHICLE.
APPLICATION FILED JULY 11, 1904.
2 SHEETS—SHEET 1.
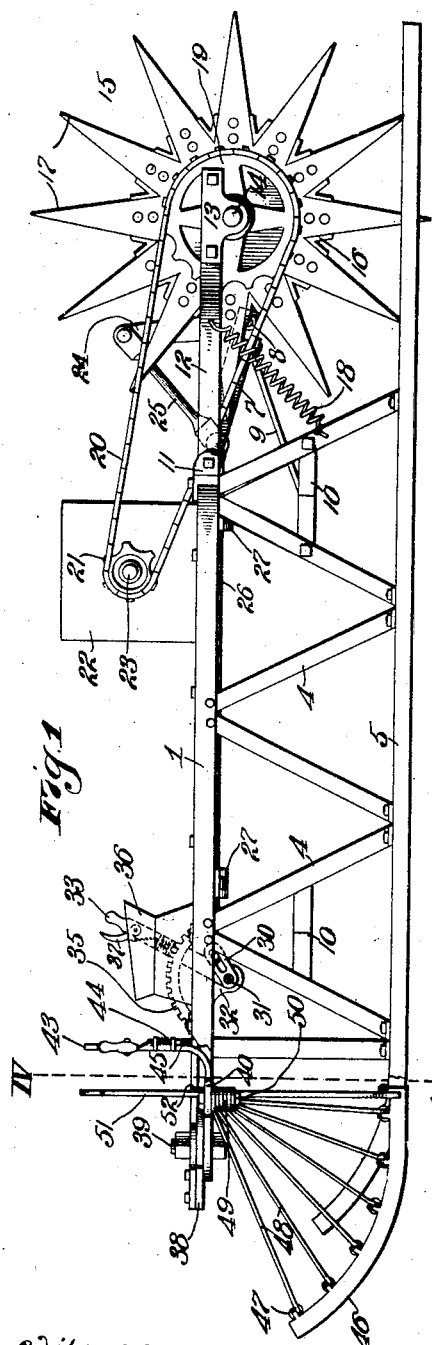
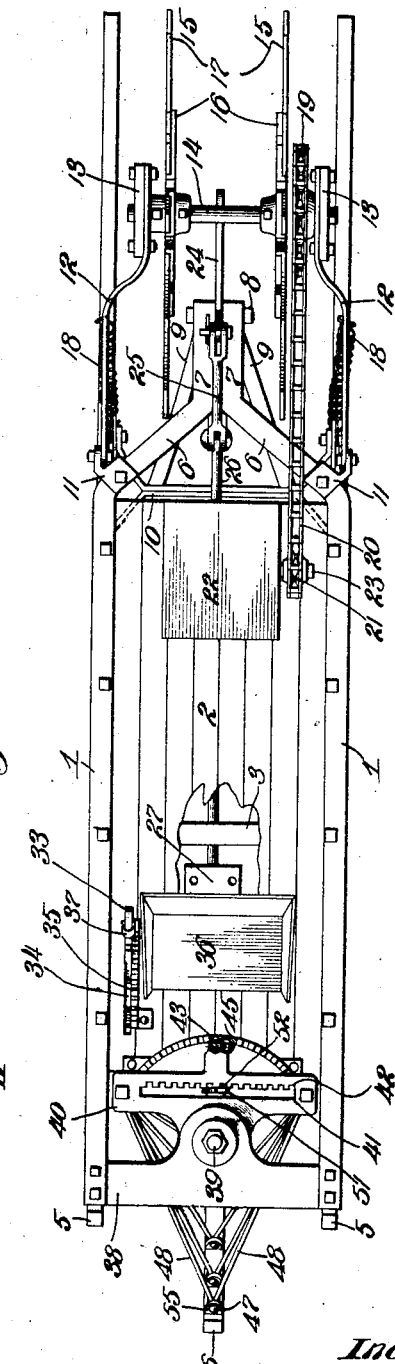
Witnesses
F. R. Slow
A. M. Straight
Inventor:
C. B. Haldeman
By George J. Thorpe atty.

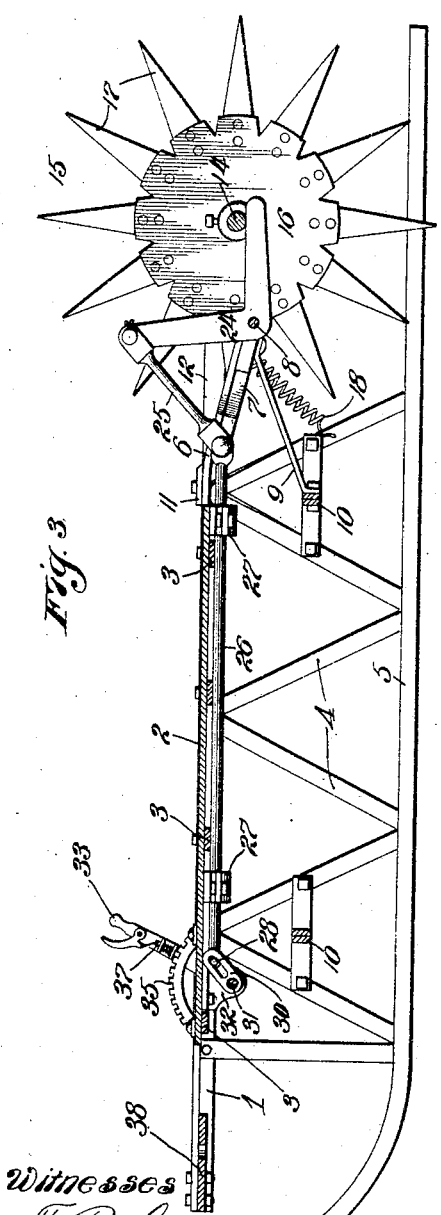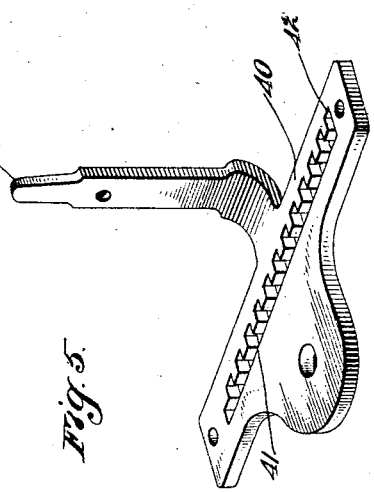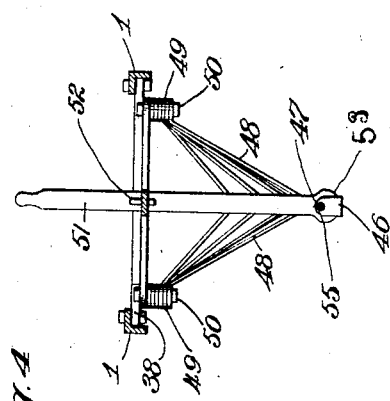

No. 786,026.

Patented March 28, 1905.

UNITED STATES PATENT OFFICE.

CHARLES B. HALDEMAN, OF AURORA, KANSAS.

SNOW OR ICE VEHICLE.

SPECIFICATION forming part of Letters Patent No. 786,026, dated March 28, 1905.

Application filed July 11, 1904. Serial No. 216,065.

*To all whom it may concern:*

Be it known that I, CHARLES B. HALDEMAN, a citizen of the United States, residing at Aurora, in the county of Cloud and State of Kansas, have invented certain new and useful Improvements in Snow or Ice Vehicles, of which the following is a specification.

This invention relates to snow and ice vehicles, and more particularly to what I term an "autosled;" and my object is to produce a vehicle of this character which will be found useful in the colder countries for traversing snow or ice covered surfaces and which may be built for transporting people or freight, or both.

A further object is to produce a vehicle of this character which can be controlled readily by a single operator and which is of simple, strong, durable, and comparatively inexpensive construction.

With these general objects in view the invention consists in certain novel and peculiar features of construction and combinations of parts, as hereinafter described and claimed, and in order that it may be fully understood reference is to be had to the accompanying drawings, in which—

Figure 1 represents a side elevation of a vehicle embodying my invention and broken away at its front end. Fig. 2 represents a top plan view of the said vehicle. Fig. 3 is a central vertical longitudinal section with the motor and the guiding mechanism omitted. Fig. 4 is a section on the line IV IV of Fig. 1. Fig. 5 is a detail perspective of the guide-runner frame.

In the said drawings, 1 designates parallel angle-irons, and 2 the bed or platform of the vehicle, said bed being supported on cross-bars 3, connecting the angle-irons.

4 designates braces standing in vertical planes and connecting the angle-irons 1 with the runners 5, the latter by preference projecting some distance rearward of the rearwardly-converging ends 6 of said angle-irons, said ends terminating in longitudinal portions 7, bolted together, as at 8, or otherwise, and said rear ends of the angle-irons are braced by braces 9, extending downwardly and forwardly to the rear cross-brace 10 of braces 4, there being, preferably, a plurality of the cross-braces 10, as shown.

11 designates brackets secured rigidly to the angle-irons, and pivoted for movement in a vertical plane to said brackets are rearwardly-projecting swing-arms 12, equipped with bearing-boxes 13 at their rear ends for the transverse shaft or axle 14 of the spur-wheel 15, said spur-wheel consisting of two similar sections by preference, each section comprising a hub portion 16, having radiating spurs or teeth 17 of sufficient length when the wheel is in operative position to successively embed themselves in the snow or ice for the purpose of utilizing the latter as a fulcrum for the propulsion of the vehicle, as hereinafter explained, said wheel being held yieldingly depressed by means of retractile springs 18, connecting the swing-arms with the rearmost braces 4, as shown clearly.

19 is a sprocket-wheel rigidly secured to shaft 14 and connected by an endless sprocket-chain 20 with the sprocket-wheel 21 on the shaft 23 of a suitable motor 22, said motor being controlled in any well-known manner and mounted upon the rear end of the bed by preference.

For the purpose of raising the spur-wheel to inoperative position when desired a bell-crank lever 24 is pivoted to and between the rear ends of the angle-irons 1 and has one arm underlying shaft 14 and its other arm pivotally connected by a link 25 with the rear end of a slide-rod 26, mounted in bearings 27, depending from the bed. The front end of said rod has a laterally-projecting pin 28 engaging the slotted crank 30 of a transverse shaft 31, journaled in bearings 32, depending from the angle-irons near their front ends, and said shaft is provided with a lever 33, projecting up through a slot 34 in the bed contiguous to the toothed sector 35, mounted upon the bed, and also contiguous to the seat 36, surmounting the bed. By this arrangement it will be seen that a forward throw of said lever results in sliding the rod 26 forward and that such action through the instrumentality of the link 25 causes the bell-crank lever to press upwardly against shaft 14 and lift the spur-wheel from engagement with the surface upon which the vehicle rests, said wheel being secured in the desired position of adjustment by means of latch mechanism 37, carried by lever 33 and arranged for engagement with sector 35. The disengagement of the latch mechanism with the sector is instantly followed by downward movement of the wheel, this movement being induced by gravity and by the action of springs 18.

Forward of the bed the angle-irons are connected by a cross-bar 38, equipped midway between said irons with a king-bolt 39, and mounted pivotally on said king-bolt is a frame 40, having a transverse slot 41, with its rear wall notched, as at 42, for a purpose which hereinafter appears, and projecting rearwardly and upwardly from said frame 40 and within convenient reach of a person occupying seat 36 is a lever 43, equipped with the usual latch mechanism 44 for engagement with the sector 45, secured to the bed and extending concentrically of the king-bolt.

46 designates a guiding-runner arranged centrally between and projecting forward of runners 5 and pivoted for lateral movement, as at 47, to the lower ends of an upwardly-projecting series of braces 48, the braces of each series converging upwardly and terminating in loops 49, secured upon vertical bolts 50, depending from the ends of frame 40. By this arrangement it will be apparent that the operator can grasp and swing the lever 43 to one side or the other, and thereby turn the guide-runner 46 in the direction which he desires to follow, and through the medium of the latch mechanism 44 secure the runner in such position. To prevent the guide-runner slipping when thus turned, and thus more reliably change the course of the vehicle, a resilient lever 51 extends through the slot 41 of the frame 40 and has a rib or tooth 52 normally engaging one of the notches 42 under the tendency of said lever to press rearwardly, the operator pressing forwardly on the lever to disengage its tooth from the engaged notch preliminary to the pivotal operation of the lever. The lower end of said lever is bifurcated, as at 53, so as to snugly embrace opposite sides of the guide-runner, and is fulcrumed on the rearmost pivotal bolt 47 of said runner in order that the operation of the lever from one side to the other shall result in turning the runner sufficiently to cause one of its lower corners to cut into the snow or ice in a manner analogous to that of a skate when the skater turns sharply. By thus embedding the guide-runner in the surface over which the vehicle is traveling the latter can be turned within a comparatively short distance.

To arrest the vehicle, the operator can stop the motor, and therefore the wheel, so that the latter will drag upon the snow or ice. If it is necessary to stop suddenly, he reverses the motor and causes the wheel to revolve backward until the momentum of the vehicle is overcome.

As the operation of the machine has been described in connection with the description of its structural features, a recapitulation is deemed unnecessary, it being understood, of course, that I reserve the right to make such changes in its form, proportion, detail construction, and organization as properly fall within the spirit and scope of the appended claims.

Having thus described the invention, what I claim as new, and desire to secure by Letters Patent, is—

1. A snow and ice vehicle, comprising a sled, a spur-wheel connected thereto, means for operating said wheel, a guide-runner at the front end of the sled, means for turning said guide-runner to one side or the other, and means for turning said runner so that one lower corner or the other shall be embedded in the snow or ice traversed by the vehicle.

2. A snow and ice vehicle, comprising a sled, a spur-wheel connected thereto, means for operating said wheel, a guide-runner at the front end of the sled, means for turning said guide-runner to one side or the other, means for turning said runner so that one lower corner or the other shall be embedded in the snow or ice traversed by the vehicle, and means for holding the spur-wheel yieldingly depressed.

3. A snow and ice vehicle, comprising a sled, a spur-wheel connected thereto, means for operating said wheel, a guide-runner at the front end of the sled, means for turning said guide-runner so that one lower corner or the other shall be embedded in the snow or ice traversed by the vehicle, means for holding the spur-wheel yieldingly depressed, and means for raising the spur-wheel to inoperative position.

4. A snow and ice vehicle, comprising a sled, a yieldingly-depressed spur-wheel connected to the sled to propel the same, means to operate said spur-wheel, means to elevate the spur-wheel, a frame pivoted for horizontal movement, at the front end of the sled, a guide-runner braced from said frame, a lever for pointing said runner in the direction in which it is desired to turn the sled, means to lock the lever in such position, a lever extending through said pivoted frame and connected to the guide-runner to twist or turn it slightly, and means for locking said lever in the desired position.

5. The combination in a snow and ice vehicle; of a sled; a cross-bar at its front end; a frame pivoted for horizontal movement, to the cross-bar; a runner; upwardly-diverging braces pivoted at their lower ends to said runner and secured at their upper ends to the ends of said frame; a lever having its lower end bifurcated and engaging said runner; and means for securing said lever vertically or at an angle to the vertical.

In testimony whereof I affix my signature in the presence of two witnesses.

CHARLES B. HALDEMAN.

Witnesses:
   ANNA STRAIGHT,
   G. Y. THORPE.